April 26, 1927.
W. D. RATCLIFF
1,625,824
GUARD FOR THE WHEELS OF VEHICLES
Filed Aug. 27, 1924    2 Sheets-Sheet 1
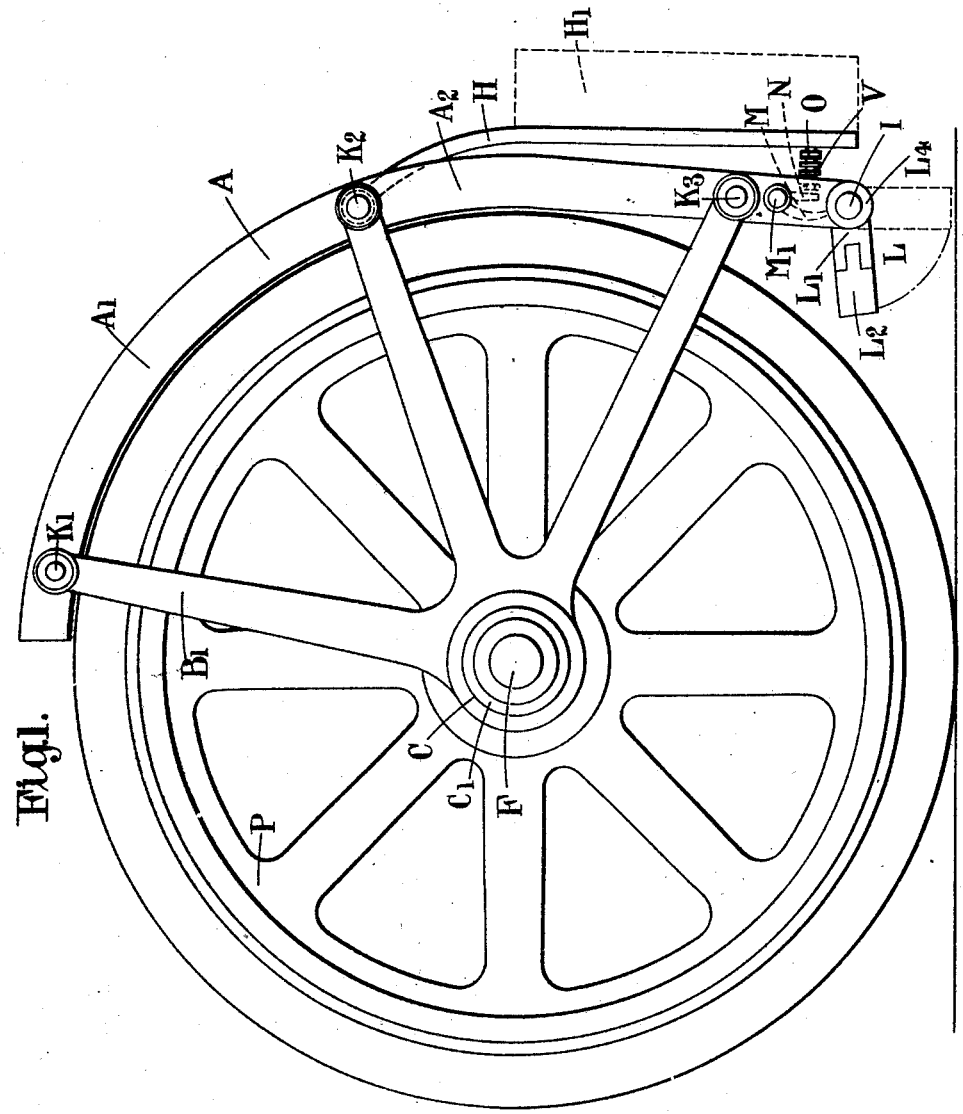
INVENTOR
William Dockray Ratcliff
BY
ATTORNEYS.

April 26, 1927.
W. D. RATCLIFF
GUARD FOR THE WHEELS OF VEHICLES
Filed Aug. 27, 1924
1,625,824
2 Sheets-Sheet 2
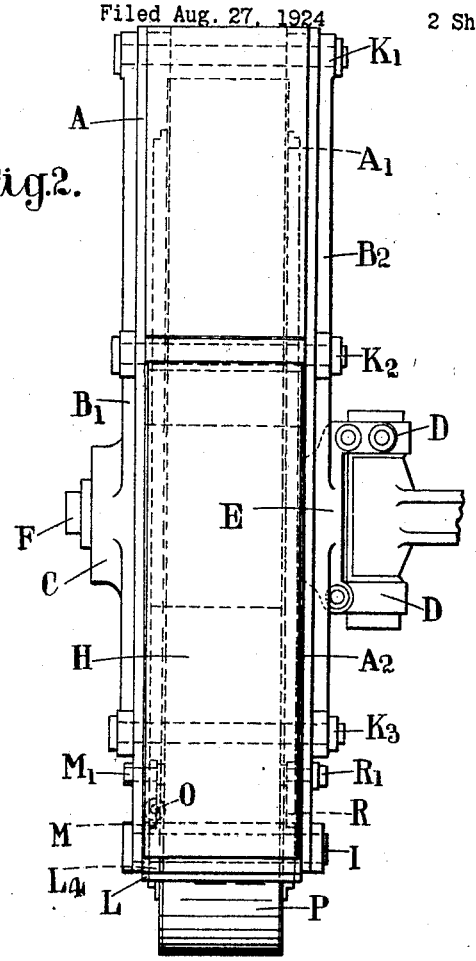
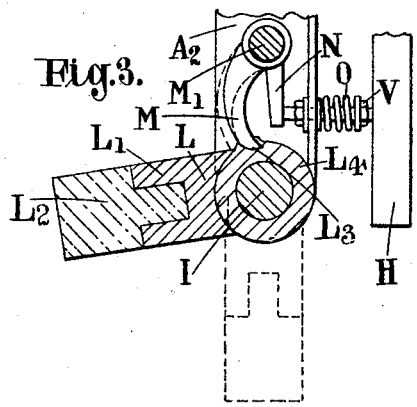
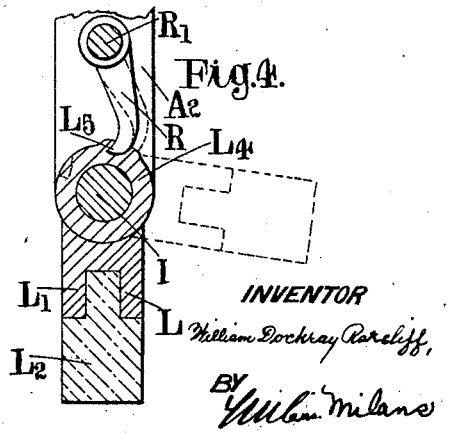
INVENTOR
William Dockray Ratcliff,
BY
ATTORNEYS Patented Apr. 26, 1927.

1,625,824

UNITED STATES PATENT OFFICE.

WILLIAM DOCKRAY RATCLIFF, OF LONDON, ENGLAND, ASSIGNOR TO INVENTORS' TRADING COMPANY, LIMITED, OF LONDON, ENGLAND.

GUARD FOR THE WHEELS OF VEHICLES.

Application filed August 27, 1924, Serial No. 734,495, and in Great Britain August 27, 1923.

This invention relates to an improved guard for the wheels of vehicles and has for its object to so completely shield the front portion of the circumference of the said wheels that they shall be prevented from passing over human or animal bodies or other obstructions accidentally struck by the vehicle.

The apparatus described herein is particularly applicable for use with the front or leading wheels of mechanically propelled road vehicles.

In its simplest form the wheel guard constructed according to my invention comprises a segmental frame adapted to embrace circumferentially the leading upper portion of the said wheel and tangentially depend downwardly to a point at a suitable distance from the ground as will allow normal road clearance. The said frame is suitably secured to two spiders, one situated on either side of the vehicle wheel, the outer spider being rotatably mounted upon the axle cap of the said wheel and the inner spider secured by bolts or other suitable means to the swivelling lug or lugs of the stub axle.

Suitably arranged in front of the vertical portion of the said frame and pivotally secured thereto at its upper end is a main guard member adapted to engage any object in the track of the said wheel. At the lower extremity of the said frame is a pivotally arranged supplementary guard member or flap which is adapted to be normally held in an approximately horizontal position by a suitably arranged pawl or pawls. This said pawl or pawls is or are adapted to be thrown out of engagement and release the said flap on any slight backward pressure being exerted on the outer face of the main guard member such as by its impact with any body or object in the track of the wheel. On being released the supplementary guard member or flap falls into a vertical position where it is retained by another suitably arranged pawl or pawls, and, closing the clearance gap between the lower extremity of the main guard member or buffer and the road, prevents the body or object from passing beneath the wheels. The main frame member of the apparatus is so secured in position that it will remain in the same radial plane with the wheel and traverse therewith in such manner that the said guard will cover the track of the wheel for any axial position that the latter may assume.

And in order that my invention may be clearly understood, reference should be made to the appended sheet of drawings in which:—

Fig. 1 is a side elevation of a front wheel of a mechanically driven vehicle fitted with a guard constructed and arranged according to my invention, the said guard being shown in its normal working position.

Fig. 2 is an end elevation of the guard and wheel shown in Fig. 1.

Fig. 3 shows in sectional detail to an enlarged scale the retaining pawl and releasing mechanism of the supplementary guard member or flap in the inoperative or normal position. The operative position of the said member is indicated in broken lines.

Fig. 4 shows in sectional detail to an enlarged scale the mechanism for holding the said supplementary guard member or flap in its vertical or inoperative position after it has been released by the mechanism shown in Fig. 3.

With reference to Figs. 1 and 2, the guard frame member A, comprising a segmental quadrant $A_1$ and a downwardly depending portion $A_2$ is secured by bolts $K_1$, $K_2$ and $K_3$, to the spiders $B_1$ and $B_2$ situated on either side of the vehicle wheel P. The outer spider $B_1$ is provided at its centre with a boss C which carries a roller, ball, or other suitable bearing $C_1$, and is rotatably mounted upon the axle cap or hub F of the wheel. The inner spider $B_2$, Fig. 2, is secured by bolts, studs or other suitable means to the swivelling lug or lugs D of the stub axle of the said wheel in such manner that the said frame A will move axially with the wheel P for any degree of angularity.

Pivotally suspended from the bolt $K_2$ of the frame member A and in front thereof is the main or operating guard member H which may be provided on its leading surface with a buffer of rubber or other suitable resilient material for absorbing shock of impact.

A frame A carries at its lower extremity a pivot pin I upon which is mounted the supplementary guard or flap L comprising a metal portion $L_1$ with which is secured a shoe of rubber or other suitable like material $L_2$ to afford a resilient face for contact with any inequality in the road surface when in the operative or vertical position.

The member L is normally held in its inoperative position by a pawl M, Fig. 3, pivotally mounted on a pin $M_1$ and adapted to engage a ratchet tooth or socket $L_3$ suitably formed on the boss $L_4$ of the said member. Preferably integrally formed with the pawl M is a lever N in operative engagement with the lower portion of the operating guard member H through the medium of a slidably mounted pin O in such manner that any slight backward pressure on the face of the said operating guard H will cause the pawl M to disengage and allow the guard member to fall into a vertical position. The tension of the spring V surrounding the pin O can be adjusted to the desired pressure required to release the pawl M.

In order that the supplementary guard member L may be retained in the operative position against any backward pressure due to impact with a body or other obstruction, a pawl R, Fig. 4, pivotally mounted on a pin $R_1$ on the inner portion of the frame A is adapted to engage a ratchet tooth $L_5$ suitably formed in the boss $L_4$ of the said member L and at the opposite end thereof to the releasing mechanism, when the said supplementary guard member is in a vertical position.

On any obstruction being encountered in the track of the wheel, by the main operating member or guard H, the pawl M disengages from the ratchet tooth $L_3$ and allowing the supplementary guard member L to fall to the vertical position, closes the normal clearance gap between the lower extremity of the member H and the road surface. The member L being retained in the vertical position by the pawl R, the body or other obstruction which causes the backward thrust upon the operating member H is prevented from passing beneath the wheel P and being crushed thereby.

What I do claim as my invention and desire to secure by Letters Patent is:—

1. A wheel guard comprising a member adapted to extend in front of the wheel with its lower end spaced from the surface over which the wheel passes, a second member connected directly to the first mentioned member for swinging movement, means for normally holding the second mentioned member at an angle to the first mentioned member, and means for releasing the second mentioned member so that it may swing into vertical position.

2. A wheel guard comprising a member adapted to extend in front of the wheel with its lower end spaced from the surface over which the wheel passes, a second member connected directly to the first mentioned member for swinging movement, means for normally holding the second mentioned member at an angle to the first mentioned member, means for releasing the second mentioned member so that it may swing into vertical position, and means for holding the second mentioned member in its vertical position.

3. A wheel guard comprising a member adapted to extend in front of the wheel with its lower end spaced from the surface over which the wheel passes, a second member connected to the first mentioned member for swinging movement, a pawl for normally holding the second mentioned member at an angle to the first mentioned member, and means for releasing the pawl so that the second mentioned member may swing into substantially vertical position.

4. A wheel guard comprising a member adapted to extend in front of the wheel with its lower end spaced from the surface over which the wheel passes, a second member connected to the first mentioned member for swinging movement, a pawl for normally holding the second mentioned member at an angle to the first mentioned member, means for releasing the pawl so that the second mentioned member may swing into vertical position, and a pawl for holding the member in its vertical position.

5. A wheel guard comprising a member adapted to extend in front of the wheel with its lower end spaced from the surface over which the wheel passes, a second member connected to the first mentioned member and normally held above the surface over which the wheel passes, and a pivoted member for releasing the second mentioned member so that it may move into close proximity to the surface.

6. A wheel guard comprising a member adapted to extend in front of the wheel with its lower end spaced from the surface over which the wheel passes, a second member connected to the first mentioned member for swinging movement, a pawl for normally holding the second mentioned member at an angle to the first mentioned member, and a pivoted member for releasing the pawl to allow the second mentioned member to swing into substantially vertical position.

7. A wheel guard comprising a member adapted to extend in front of the wheel with its lower end spaced from the surface over which the wheel passes, a second member connected to the first mentioned member for swinging movement, a pawl for normally holding the second mentioned member at an angle to the first mentioned member, and a spring control pivoted member for releasing the pawl to allow the second mentioned member to swing into substantially vertical position.

8. A wheel guard comprising a member adapted to extend in front of the wheel with its lower end spaced from the surface over which the wheel passes, a second member connected to the first mentioned member and normally held above the surface over which the wheel passes, means for releasing the second mentioned member whereby it may fall into close proximity to the surface, and means for supporting the guard so that it will move with the wheel in its steering movement.

WILLIAM DOCKRAY RATCLIFF.